June 25, 1957  L. L. THOMPSON  2,796,883
AUTOMATIC TANK SHUT-OFF
Filed March 9, 1956
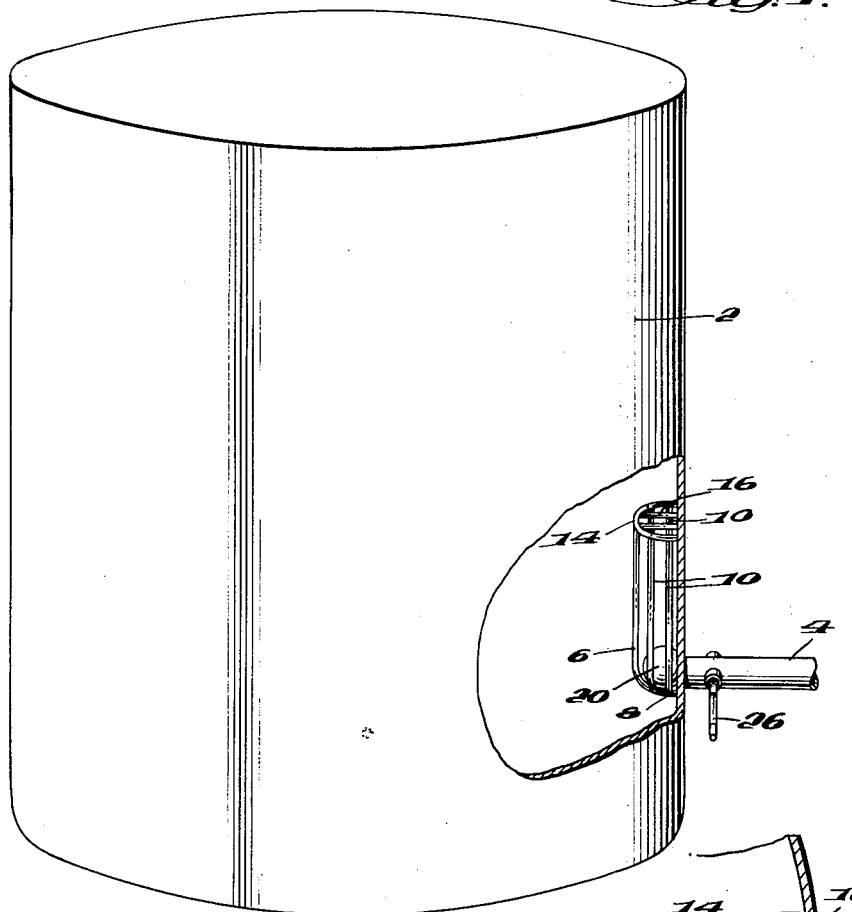
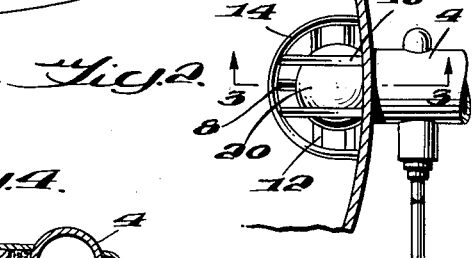
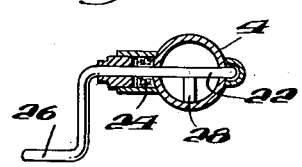
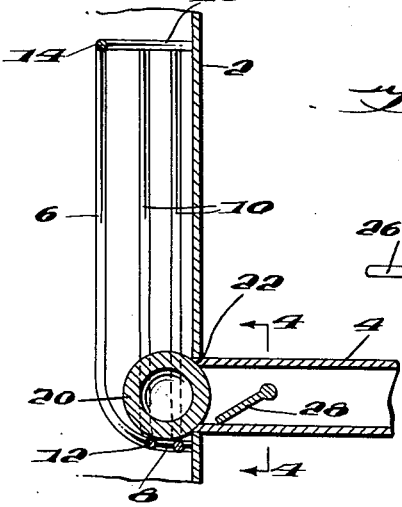
INVENTOR
LONNIE LEE THOMPSON
BY
ATTORNEYS ed States Patent Office 2,796,883
Patented June 25, 1957

2,796,883
AUTOMATIC TANK SHUT-OFF
Lonnie L. Thompson, Odessa, Tex.
Application March 9, 1956, Serial No. 570,639
4 Claims. (Cl. 137—399)

The invention relates to an automatic shut-off valve mechanism for oil tanks.

In gathering oil from lease tanks to be transported by pipe line to distant points, it often happens that air is permitted to enter the pipe line gathering system. If the oil level in the producer's tank is permitted to fall below the level of the top of the pipe line connection, air enters the pipe line and moves to some high point in the line. Air can then be trapped in the oil stream and will halt the flow of oil by gravity.

By keeping oil gathering lines free of air, the following advantages are gained:

1. Internal corrosion of the pipe line is reduced;
2. Failure of check valves due to corrosion of working parts, and consequent loss of oil by overflowing the tanks is avoided;
3. Air pockets that block the flow of oil are eliminated;
4. Maintenance on pumping units is reduced by assuring the lubrication of working parts.
5. Time normally consumed in bleeding air from the pipe lines is saved.

A further object of the invention is to provide a valve which is simple and inexpensive construction, is accurate and certain in operation, and is easy to release.

An additional object of the invention is to provide a construction in which the valve is accurately guided onto its seat.

Further objects and advantages of the invention will appear more fully from the following description, especially when taken in conjunction with the accompanying drawings which form a part thereof.

In the drawings:

Figure 1 shows in perspective, with parts cut away, a tank provided with a valve embodying my invention;

Figure 2 is a top plan view of the valve arrangement;

Figure 3 is a cross-section on the line 3—3 of Figure 2; and

Figure 4 is a cross-section on the line 4—4 of Figure 3.

The invention is shown in connection with a tank 2 having an outlet line 4 for connection to a pipe line.

On the inner wall of the tank opposite the pipe 4 is secured a cage formed of bars or rods. This cage includes a vertical bar 6 having its lower end 8 bent in a curve and secured to the tank wall just below the outlet 4. Other vertical bars 10 extend parallel to bar 6 and have their lower ends 12 bent in and secured as by welding to bar 8. The tops of all the bars are secured to a U-shaped piece 14, the legs of which are secured to the tank wall. Bars 16 close the upper end of the cage.

Guided in the cage is a float 18 in the form of a hollow ball. The diameter of the float is slightly greater than the inside diameter of outlet 4, but is less than the dimensions of the cage. The ball can engage a ground conical or spherical seat 20 at the entrance to the outlet pipe. The lower end 8 of the cage bar 6 is located at a distance below the axis of the outlet pipe 4 substantially equal to the radius of float 18, so that the float is accurately guided to seated position when the liquid level in the tank falls to the level of the outlet.

In order to release the float when the tank is refilled, there is a shaft 22 mounted by a packing box 24 in pipe 4. This shaft has a crank 26 by which it can be turned, and also has inside pipe 4 a tongue or projection 28 which can engage ball 18 and push it away from its seated position.

When oil is pumped into tank 2, the float will automatically rise as the level of oil in tank increases. The ball float will settle in the ground seat of the pipe line outlet when the oil level falls to the pipe line outlet. The curved bottom part of the cage causes the ball to roll toward the pipe line outlet to seal off and eliminate air from entering the pipe line. The float trip can be used to kick the ball float out of the ground seat and oil from the tank then flows through the cage and into the pipe line.

While I have described herein one embodiment of my invention, I wish it to be understood that I do not intend to limit myself thereby except within the scope of the claims hereto or hereinafter appended.

I claim:

1. A shutoff valve for an outlet line from a tank, comprising a cage mounted on the inside wall of the tank and extending from a point slightly below the outlet line to a point substantially above the outlet line, a spherical float within said cage of a diameter greater than the inside diameter of the outlet pipe, the bottom of said cage having a portion curved towards the tank wall and being spaced below the axis of the outlet line by a distance substantially equal to the radius of said float.

2. In a device as claimed in claim 1, said outlet line having a conical seat at its inner end.

3. In a device as claimed in claim 1, a shaft extending into said outlet line adjacent to the tank, a handle on said shaft outside the line, and a projection on said shaft inside the line engageable with the float to displace it from the entrance of the line.

4. In a device as claimed in claim 3, packing means sealing said shaft in said outlet line.

References Cited in the file of this patent
UNITED STATES PATENTS

| | | |
|---|---|---|
| 1,264,296 | Hagan | Apr. 30, 1918 |
| 1,983,891 | Ball | Dec. 11, 1934 |
| 2,211,296 | Shaft | Aug. 13, 1940 |
| 2,715,414 | Kinzbach et al. | Aug. 16, 1955 |